United States Patent
Lake et al.

(10) Patent No.: US 9,299,248 B2
(45) Date of Patent: Mar. 29, 2016

(54) METHOD AND APPARATUS FOR ANALYZING CAPACITIVE EMG AND IMU SENSOR SIGNALS FOR GESTURE CONTROL

(71) Applicant: Thalmic Labs Inc., Kitchener (CA)

(72) Inventors: Stephen Lake, Kitchener (CA); Matthew Bailey, Kitchener (CA); Aaron Grant, Kitchener (CA)

(73) Assignee: THALMIC LABS INC., Kitchener (CA)

( * ) Notice: Subject to any disclaimer, the term of this patent is extended or adjusted under 35 U.S.C. 154(b) by 47 days.

(21) Appl. No.: 14/186,878

(22) Filed: Feb. 21, 2014

(65) Prior Publication Data

US 2014/0240223 A1    Aug. 28, 2014

Related U.S. Application Data

(60) Provisional application No. 61/768,322, filed on Feb. 22, 2013.

(51) Int. Cl.
| | | |
|---|---|---|
| *G08C 17/02* | (2006.01) | |
| *G06F 3/01* | (2006.01) | |
| *G06F 1/16* | (2006.01) | |

(52) U.S. Cl.
CPC ............ *G08C 17/02* (2013.01); *G06F 1/163* (2013.01); *G06F 3/011* (2013.01); *G06F 3/015* (2013.01); *G06F 3/016* (2013.01); *G06F 3/017* (2013.01); *G08C 2201/32* (2013.01)

(58) Field of Classification Search
CPC ......... G06F 1/163; G06F 3/015; G06F 3/016; G06F 3/017
See application file for complete search history.

(56) References Cited

U.S. PATENT DOCUMENTS

| | | |
|---|---|---|
| 3,620,208 A | 11/1971 | Higley et al. |
| 3,880,146 A | 4/1975 | Everett et al. |
| 4,602,639 A | 7/1986 | Hoogendoorn et al. |

(Continued)

FOREIGN PATENT DOCUMENTS

| | | |
|---|---|---|
| EP | 0 301 790 A2 | 2/1989 |
| WO | 2011/070554 A2 | 6/2011 |

OTHER PUBLICATIONS

Bailey et al., "Muscle Interface Device and Method for Interacting With Content Displayed on Wearable Head Mounted Displays," Office Action mailed Mar. 31, 2015, for U.S. Appl. No. 14/155,087, 15 pages.

(Continued)

*Primary Examiner* — Michael Pervan
(74) *Attorney, Agent, or Firm* — Seed IP Law Group PLLC (57) ABSTRACT

There is disclosed a muscle interface device for use with controllable connected devices. In an embodiment, the muscle interface device comprises a sensor worn on the forearm of a user, and the sensor is adapted to recognize a plurality of gestures made by a user to interact with a controllable connected device. The muscle interface device utilizes a plurality of sensors, including one or more of capacitive EMG sensors and an IMU sensor, to detect gestures made by a user. Other types of sensors including MMG sensors may also be used. The detected user gestures from the sensors are processed into a control signal for allowing the user to interact with content displayed on the controllable connected device.

22 Claims, 10 Drawing Sheets

(56) References Cited

U.S. PATENT DOCUMENTS

| | | | |
|---|---|---|---|
| 5,482,051 | A | 1/1996 | Reddy et al. |
| 6,244,873 | B1 | 6/2001 | Hill et al. |
| 6,720,984 | B1 | 4/2004 | Jorgensen et al. |
| 6,807,438 | B1 | 10/2004 | Brun Del Re et al. |
| 6,865,409 | B2 | 3/2005 | Getsla et al. |
| 7,333,090 | B2 | 2/2008 | Tanaka et al. |
| 7,596,393 | B2 | 9/2009 | Jung et al. |
| 7,809,435 | B1 | 10/2010 | Ettare et al. |
| 8,170,656 | B2 | 5/2012 | Tan et al. |
| 8,203,502 | B1 | 6/2012 | Chi et al. |
| 8,212,859 | B2 | 7/2012 | Tang et al. |
| 8,421,634 | B2 | 4/2013 | Tan et al. |
| 8,447,704 | B2 * | 5/2013 | Tan et al. .................. 706/12 |
| 8,922,481 | B1 | 12/2014 | Kauffmann et al. |
| 2002/0077534 | A1 | 6/2002 | DuRousseau |
| 2004/0073104 | A1 | 4/2004 | Brun del Re et al. |
| 2005/0177038 | A1 | 8/2005 | Kolpin et al. |
| 2006/0061544 | A1 | 3/2006 | Min et al. |
| 2008/0136775 | A1 | 6/2008 | Conant |
| 2009/0051544 | A1 | 2/2009 | Niknejad |
| 2009/0251407 | A1 | 10/2009 | Flake et al. |
| 2009/0318785 | A1 | 12/2009 | Ishikawa et al. |
| 2010/0280628 | A1 | 11/2010 | Sankai |
| 2010/0293115 | A1 | 11/2010 | Seyed Momen |
| 2011/0134026 | A1 | 6/2011 | Kang et al. |
| 2011/0166434 | A1 | 7/2011 | Gargiulo |
| 2011/0172503 | A1 | 7/2011 | Knepper et al. |
| 2012/0029322 | A1 | 2/2012 | Wartena et al. |
| 2012/0157789 | A1 * | 6/2012 | Kangas et al. .................. 600/300 |
| 2012/0165695 | A1 | 6/2012 | Kidmose et al. |
| 2012/0188158 | A1 | 7/2012 | Tan et al. |
| 2012/0265090 | A1 | 10/2012 | Fink et al. |
| 2012/0293548 | A1 | 11/2012 | Perez et al. |
| 2012/0302858 | A1 | 11/2012 | Kidmose et al. |
| 2013/0005303 | A1 | 1/2013 | Song et al. |
| 2013/0027341 | A1 | 1/2013 | Mastandrea |
| 2013/0127708 | A1 | 5/2013 | Jung et al. |
| 2013/0165813 | A1 | 6/2013 | Chang et al. |
| 2013/0191741 | A1 * | 7/2013 | Dickinson et al. ............ 715/702 |
| 2013/0198694 | A1 | 8/2013 | Rahman et al. |
| 2013/0317648 | A1 | 11/2013 | Assad |
| 2014/0028546 | A1 | 1/2014 | Jeon et al. |
| 2014/0049417 | A1 | 2/2014 | Abdurrahman et al. |
| 2014/0198034 | A1 | 7/2014 | Bailey et al. |
| 2014/0198035 | A1 | 7/2014 | Bailey et al. |
| 2014/0349257 | A1 | 11/2014 | Connor |
| 2014/0354528 | A1 | 12/2014 | Laughlin et al. |
| 2014/0354529 | A1 | 12/2014 | Laughlin et al. |

OTHER PUBLICATIONS

Bailey et al., "Wearable Muscle Interface Systems, Devices and Methods That Interact With Content Displayed on an Electronic Display," Office Action mailed Mar. 31, 2015, for U.S. Appl. No. 14/155,107, 17 pages.

Bailey et al., "Muscle Interface Device and Method for Interacting With Content Displayed on Wearable Head Mounted Displays," Preliminary Amendment filed Jan. 28, 2014, for U.S. Appl. No. 14/155,087, 8 pages.

Costanza et al., "EMG as a Subtle Input Interface for Mobile Computing," Mobile HCI 2004, LNCS 3160, edited by S. Brewster and M. Dunlop, Springer-Verlag Berlin Heidelberg, pp. 426-430, 2004.

Costanza et al., "Toward Subtle Intimate Interfaces for Mobile Devices Using an EMG Controller," CHI 2005, Proceedings of the SIGCHI Conference on Human Factors in Computing Systems, pp. 481-489, 2005.

Ghasemzadeh et al., "A Body Sensor Network With Electromyogram and Inertial Sensors: Multimodal Interpretation of Muscular Activities," IEEE Transactions on Information Technology in Biomedicine, vol. 14, No. 2, pp. 198-206, Mar. 2010.

International Search Report and Written Opinion, mailed May 16, 2014, for corresponding International Application No. PCT/US2014/017799, 11 pages.

Lake et al., "Methods and Devices That Combine Muscle Activity Sensor Signals and Inertial Sensor Signals for Gesture-Based Control," U.S. Appl. No. 14/186,889, filed Feb. 21, 2014, 58 pages.

Morris et al., "Emerging Input Technologies for Always-Available Mobile Interaction," *Foundations and Trends in Human-Computer Interaction* 4(4):245-316, 2011. (74 total pages).

Naik et al., "Real-Time Hand Gesture Identification for Human Computer Interaction Based on ICA of Surface Electromyogram," IADIS International Conference Interfaces and Human Computer Interaction 2007, 8 pages.

Picard et al., "Affective Wearables," Proceedings of the IEEE $1^{st}$ International Symposium on Wearable Computers, ISWC, Cambridge, MA, USA, Oct. 13-14, 1997, pp. 90-97.

Rekimoto, "GestureWrist and GesturePad: Unobtrusive Wearable Interaction Devices," ISWC '01 Proceedings of the $5^{th}$ IEEE International Symposium on Wearable Computers, 2001, 7 pages.

Saponas et al., "Making Muscle-Computer Interfaces More Practical," CHI 2010, Atlanta, Georgia, USA, Apr. 10-15, 2010, 4 pages.

Xiong et al., "A Novel HCI based on EMG and IMU," Proceedings of the 2011 IEEE International Conference on Robotics and Biomimetics, Phuket, Thailand, Dec. 7-11, 2011, 5 pages.

Zhang et al., "A Framework for Hand Gesture Recognition Based on Accelerometer and EMG Sensors," IEEE Transactions on Systems, Man, and Cybernetics—Part A: Systems and Humans, vol. 41, No. 6, pp. 1064-1076, Nov. 2011.

Office Action dated Nov. 5, 2015 for U.S. Appl. No. 14/186,889, 11 pages.

Office Action dated Nov. 5, 2015 for U.S. Appl. No. 14/476,093, 40 pages.

Office Action dated Nov. 6, 2015 for U.S. Appl. No. 14/194,252, 7 pages.

* cited by examiner

METHOD AND APPARATUS FOR ANALYZING CAPACITIVE EMG AND IMU SENSOR SIGNALS FOR GESTURE CONTROL

FIELD OF THE INVENTION

The present disclosure relates generally to human-computer interface devices, and more specifically to a wearable, muscle control sensor based human-computer interface (HCI).

BACKGROUND OF THE INVENTION

In recent years, there has been an increasing need for human-computer interfaces, or HCI's, for use in various control applications. A dominant underlying technology behind muscle computer interfaces is the sensing of muscle activity through the surface of the skin, called sEMG (surface electromyography), to sense hand and arm gestures a user is performing. For example, a device may be worn on the wrist or forearm of a user that contains EMG sensors for the acquisition of this electrical activity. Pattern recognition algorithms are used to analyze the electrical data to determine the gestures that the user is making. There is a comprehensive overview of this technology and its limitations in U.S. Pat. No. 8,170,656.

In order for these types of gesture sensing devices to be commercially viable, the devices must have a very high gesture detection rate with a relatively low build cost. One limitation is that sEMG based sensors are very susceptible to variations in operating conditions, and signals generated by sEMG sensors may be affected by such variables as skin perspiration, amount of hair, and fat content in the skin. Because of this, it is very difficult to achieve high gesture recognition rates using just sEMG sensors alone.

Therefore, what is needed is an effective HCI device which overcomes these limitations in the prior art.

SUMMARY OF THE INVENTION

The present disclosure relates to human-computer interface devices, and more specifically to a wearable muscle control sensor based human-computer interface (HCI).

In an embodiment, the wearable muscle control device is worn on the forearm of the user, and includes a plurality of capacitive electromyography (cEMG) sensors. Advantageously, the cEMG sensors do not require direct contact with the skin of the user, and therefore are not susceptible to the signal variations that are characteristic to surface electromyography (sEMG) sensors used in the prior art. The muscle control device further includes an inertial measurement unit (IMU) which has an accelerometer to measure the acceleration of the user's arm. The muscle control device may further contain a filtering module to filter and process the acquired signals from the sensors, an analog to digital converter to convert an analog signal to digital, and a processing unit configured to recognize the gestures the user is making from the processed cEMG and IMU signals.

In an embodiment, the device may be connected by wire to a connected device which receives control inputs from the muscle control device. Alternatively, the muscle control device contains one or more batteries and a wireless transceiver module for wireless connection to the connected device.

Preferably, the device takes the form of an expandable band that is able to stay in position on a user's forearm. The device may also contain a vibratory motor which may be used for providing haptic feedback to a user to confirm an event, or to request an input.

In another embodiment, various other types of sensors may be used in combination with cEMG sensors to detect gestures made by a user. This may include, for example, mechanomyography (MMG) sensors to detect vibrations made by muscles during contraction.

In another embodiment, the muscle interface device includes a calibration module with a routine for calibrating the muscle interface device for use with a connected device or HCI.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

The present disclosure relates generally to human-computer interface devices, and more specifically to a wearable, muscle control sensor based human-computer interface (HCI).

In an embodiment, the wearable muscle control device is worn on the forearm of the user, and includes a plurality capacitive electromyography (cEMG) sensors, referred to as a "differential non-contact sensor system for measuring biopotential signals" in Appendix A to this application, which is incorporated herein by reference in its entirety.

A cEMG signal is an oscillating waveform that varies in both frequency and amplitude, and a majority of signal information is contained within the 5 Hz to 250 Hz frequency band. Advantageously, the cEMG sensors are active, in that they have an amplification stage located on the sensor board itself. The signal from the cEMG sensor is therefore amplified before it is sent to the main logic board of the device to minimize transmission line interference.

Advantageously, the cEMG sensors sense the muscle activity by capacitively coupling to the muscle activity which induces a charge in the cEMG electrode, thereby obviating the need for a direct electrical connection with the skin. Therefore, by avoiding a direct electrical connection, the signal is less susceptible to variations resulting from a direct connection.

In an embodiment, the muscle control device further includes an IMU which has an accelerometer to measure the acceleration of the user's arm. The IMU may include an accelerometer which senses accelerations in three degrees of freedom (x, y, z directions), and may sense the location of the muscle control device on the body of a user (e.g. the forearm). The signal generated from the IMU may therefore be used to measure larger gestures made by the arm of the user, in addition to finer muscle control gestures detected by the plurality of cEMG sensors.

In an embodiment, the muscle control device may further contain a filtering module to filter and process the acquired signals from the sensors, an analog to digital converter to convert an analog signal to digital, and a processing unit configured to recognize the gestures the user is making from the processed cEMG and IMU signals.

In an embodiment, the device may be connected by wire to a connected device which receives control inputs from the muscle control device. Alternatively, the muscle control device contains one or more batteries and a wireless transceiver module for wireless connection to the connected device.

In addition to cEMG, MMG, and accelerometer sensors, various other types of sensors may be used to detect gestures made by a user. However, some of these sensors may have drawbacks if used alone.

For example, surface electromyographic (sEMG) sensors may be used to measure forearm muscle activity. An sEMG sensor typically requires direct contact with the skin of the user in order to measure the electrical activity conducted from the underlying muscles, through the fat and skin. There are some inherent limitations with sEMG, as the quality of the acquired signal is directly related to the skin impedance, which varies according to the user's skin perspiration, amount of arm hair, fat content, and a number of other attributes. This may necessitate the use of moisturizing and conductive gels, shaving the skin, or other skin preparation practices to get a reliable and repeatable signal from this type of sensor. In contrast, the cEMG sensors of the present invention do not require direct surface contact or skin preparations.

As another example, one or more accelerometer sensors may be used to measure larger gestures made by a user, for example involving the elbow or even the shoulders of a user. When used together with cEMG and/or MMG sensors for detecting more limited gestures (e.g. made by the hand and/or wrist for example), the accelerometer can also provide relative velocity and orientation data in combination with the cEMG sensors gestural data to increase the range of control inputs.

An illustrative embodiment will now be described with reference to the drawings.

Figure 1:
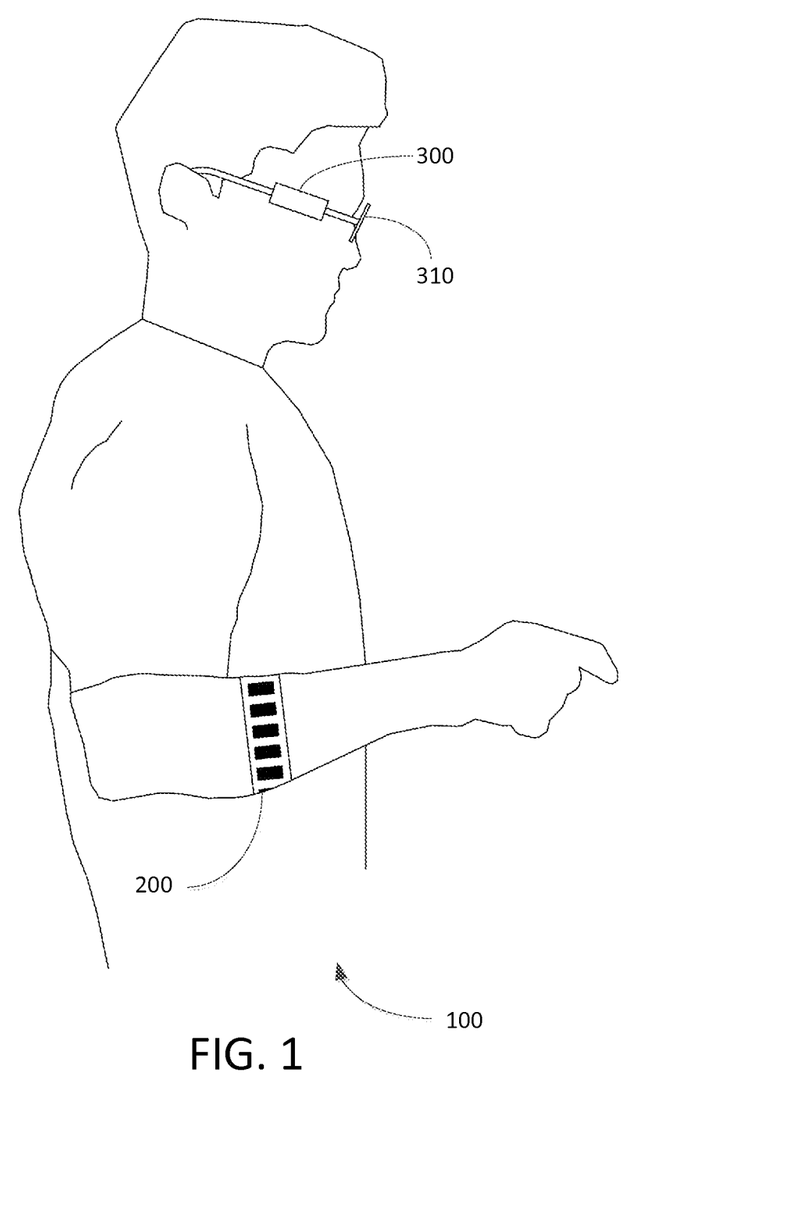
FIG. 1 illustrates a user wearing a connected device and a muscle interface device in accordance with an embodiment.

Shown in FIG. 1 is an illustrative user 100 wearing a connected device 310 with connected device control 300, and a muscle interface device 200 in accordance with an embodiment. In this illustrative example, muscle interface device 200 is a flexible, stretchable band that may be worn on the forearm of user 100 as shown.

Figure 2A:
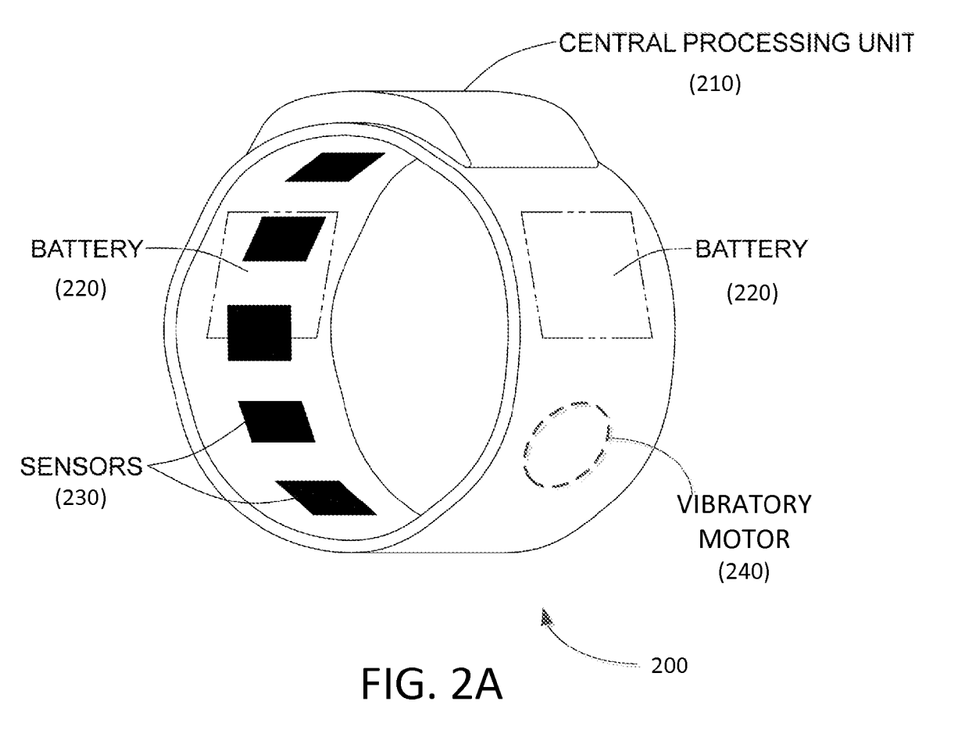
FIG. 2A illustrates a detailed view of a muscle interface device in accordance with an embodiment.

FIG. 2A illustrates a detailed view of the muscle interface device 200 of FIG. 1 in accordance with an embodiment. As shown, muscle interface device 200 may comprise a central processing unit (CPU) 210, and one or more batteries 220, which may be rechargeable, and which may be utilized concurrently or sequentially in conventional manner. As shown, muscle interface device 200 includes a plurality of sensors 230 which may be positioned radially around the circumference of the band, such that the sensors 230 can detect gestures made by user 100. Muscle interface device 200 may further include a feedback mechanism, such as a vibratory motor 240 to provide haptic feedback as described further below.

In a preferred embodiment, for simplicity, the muscle interface device 200 is marked to be worn in the appropriate position and orientation on the arm. For example, a marking on the muscle interface device may show the top center of the forearm and the direction in which the muscle interface device 200 should be worn.

In an alternative embodiment, the muscle interface device 200 may be calibrated when first worn, prior to operation, such that the positioning of the sensors 230 does not need to depend on the location of particular muscles in the forearm.

Figure 2B:
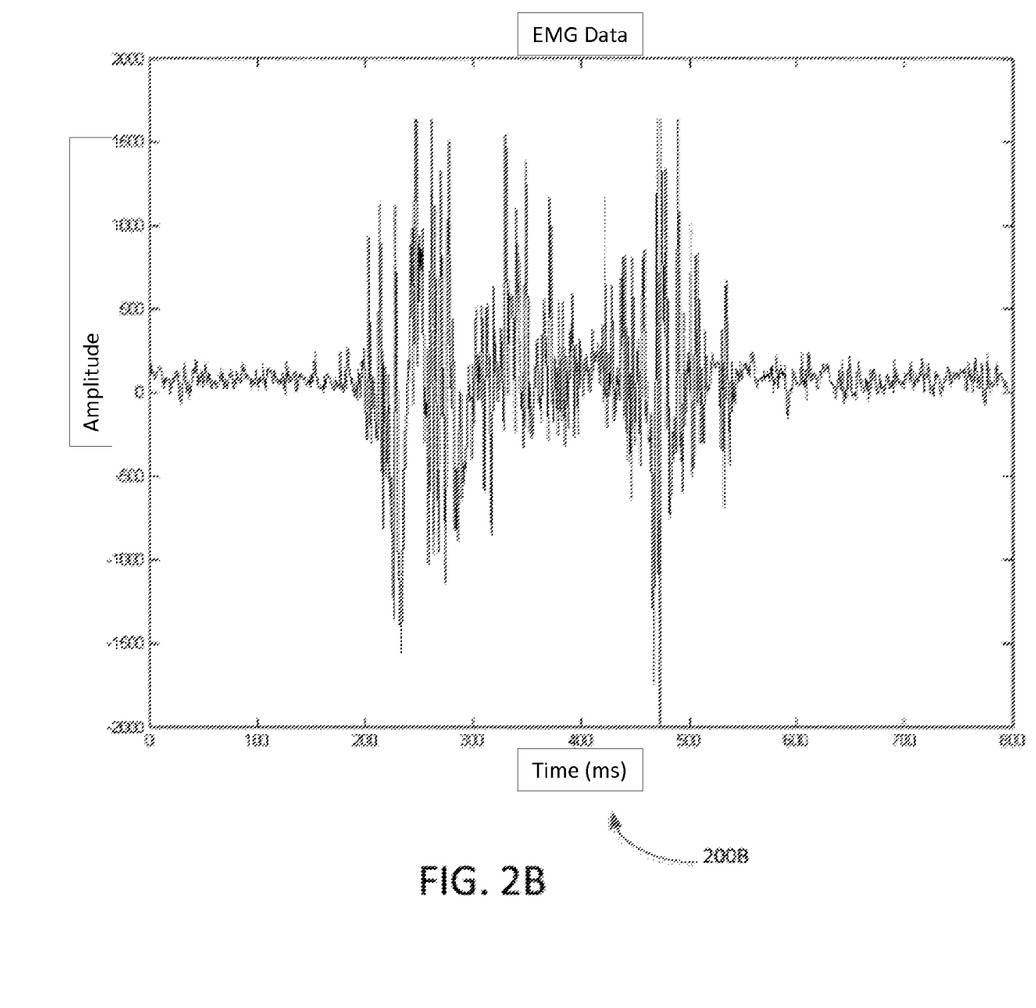
FIG. 2B illustrates a data graph corresponding to an electrical signal detected by a cEMG sensor.

In an embodiment, sensors 230 include at least one or more cEMG sensors adapted to detect electrical signals in the forearm of user 100 for generating a control signal. cEMG does not require direct contact with the skin as with sEMG sensors described earlier. Rather, cEMG sensors are capacitively coupled to the electrical signals generated by contracting muscles, and may operate at a distance of up to 3 mm from the skin. By way of example, the cEMG signal can be an oscillating waveform that varies in both frequency and amplitude, and the majority of signal information is contained within the 5 Hz to 250 Hz frequency band. An illustrative example of a cEMG signal is shown in FIG. 2B.

In another embodiment, one or more MMG sensors comprising piezoelectric sensors may be used to measure the vibrations at the surface of the skin produced by the underlying muscles when contracted. By way of example, the MMG signal generated may be an oscillating waveform that varies in both frequency and amplitude, and a majority of signal information is contained within the 5 Hz to 250 Hz frequency band. Because the MMG signal is acquired via mechanical means, electrical variations like skin impedance do not have an effect on the signal. The MMG signal is very similar to the illustrative example of the cEMG signal shown in FIG. 2B.

Thus, cEMG or MMG both provide a reliable control signal that can be obtained over the duration of a full day, as skin perspiration and moisturization changes do not affect the signal.

In another embodiment, sensors 230 may include one or more accelerometer sensors for detecting additional aspects of gestures made by user 100 in three degrees of freedom. The accelerometer signal consists of a three digital channels of data, each representing the acceleration in either the x, y, or z direction. The signal is subject to all of the accelerations that the users arm is subject to, and may further incorporate motion of the body as a whole.

Figure 3:
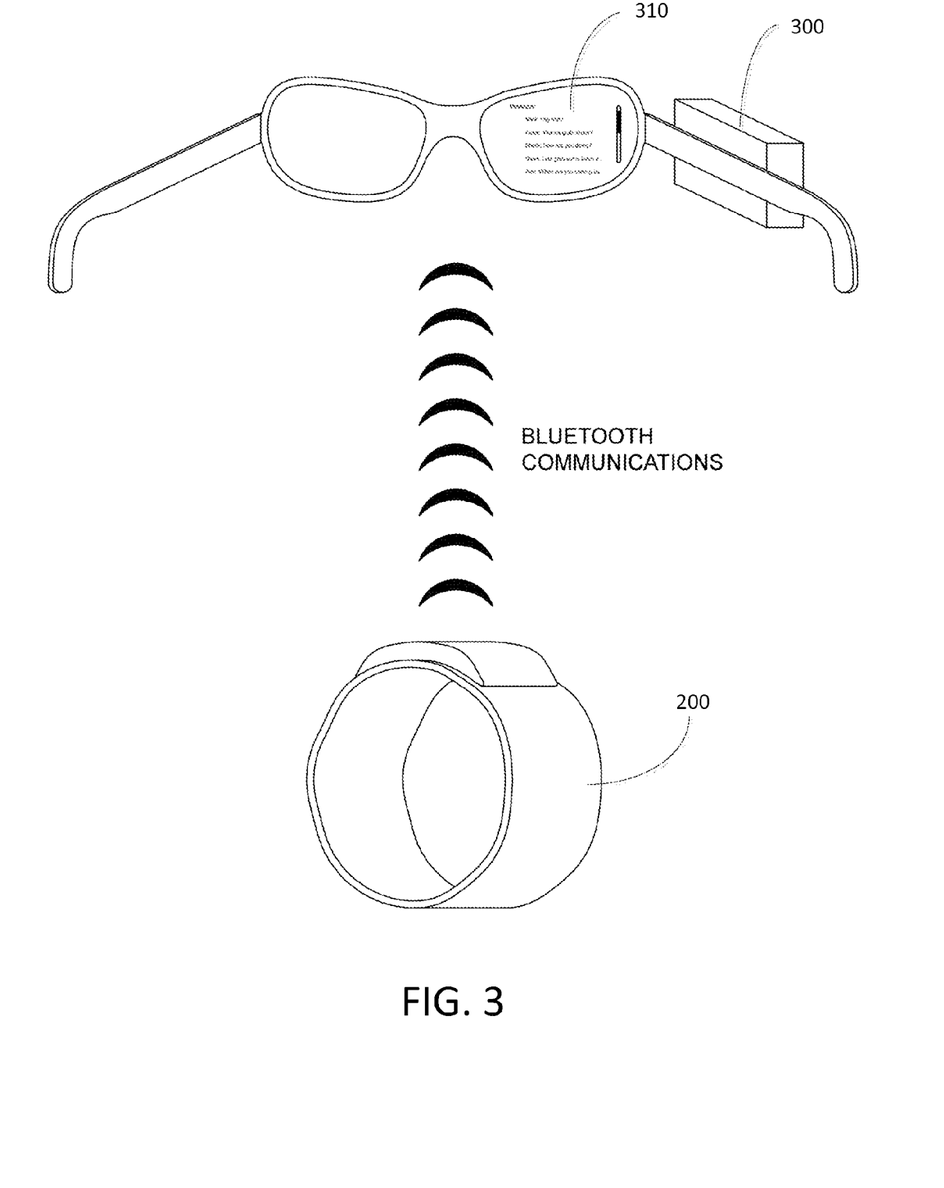
FIG. 3 illustrates wireless communication between a connected device and a muscle interface device in accordance with an embodiment of the invention.

Now referring to FIG. 3, shown is an illustration of wireless communication (e.g. Bluetooth) between muscle interface device 200 and a connected device 310 and connected device control 300. The illustrative connected device in this example is a wearable head display. However, it will be appreciated that the connected device may be one of any number of devices that may receive a control input, including but not limited to a general purpose computer, a robot, an electronic consumer device, a mobile phone, etc.

This wireless communication is utilized to transmit the control signal from muscle interface device 200 to connected device control 300. This is illustrated by way of example in FIG. 4, in which user's hand and wrist gesture is detected and processed as a control signal by the muscle interface device 200 for interacting with content displayed on the connected device 310.

Figure 4:
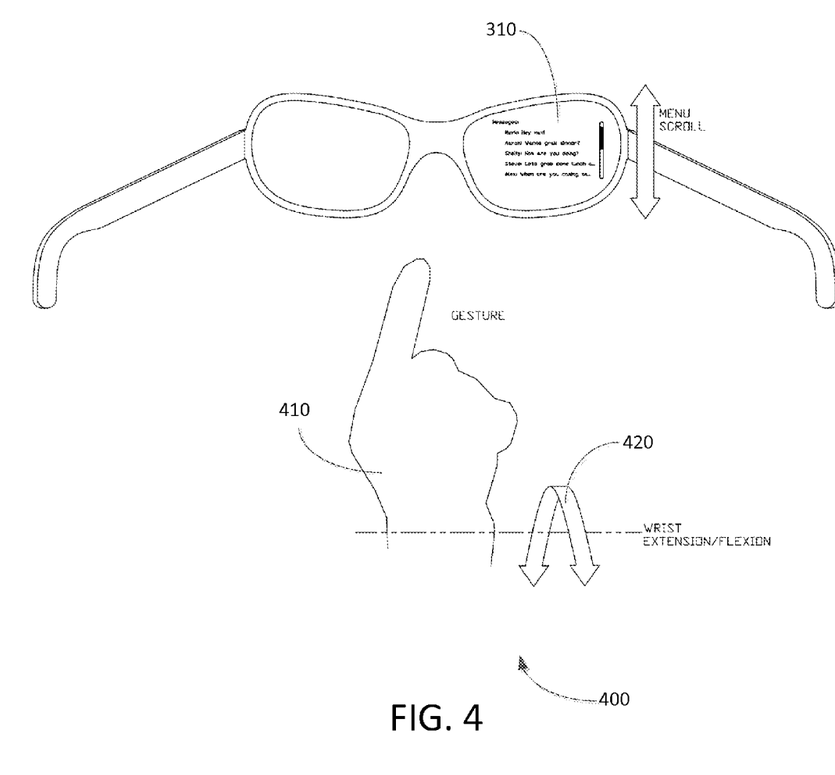
FIG. 4 illustrates a user's hand and wrist gesture processed as a control signal by the muscle interface device for interacting with content displayed on the connected device.

In this particular example, a gesture 410 made by the user extending an index finger, and making a wrist flexion motion 420 is detected by the sensors 230 of muscle interface device 200, and processed by CPU 210 (FIG. 2) as a control signal for causing a menu appearing on display 310 to scroll downwards.

As another example, a similar gesture in which user 100 extends the index finger and makes a wrist extension motion is detected by sensors 230 of muscle interface device 200 and processed by CPU 210 (FIG. 2) as a control signal for causing a menu appearing on display 310 to scroll upwards.

As yet another example, a gesture in which user 100 extends the index finger and makes a poking motion involving a slight movement of the elbow and shoulder may be detected by sensors 230 of muscle interface device 200 and processed by CPU 210 (FIG. 2) as a control signal for causing a highlighted menu item appearing on display 310 to be selected.

If the user extends a different finger other than the index finger, sensors 230 will detect this and may cause a different control signal to be generated. For example, extending the pinky finger instead of the index finger may cause muscle interface device 200 to interpret the user's gestures with functions analogous to clicking a right mouse button rather than a left mouse button in a conventional mouse user interface. Extending both the index and pinky fingers at the same time may cause muscle interface device 200 to interpret the user's gestures with yet other functions analogous to clicking a third mouse button in a conventional mouse user interface.

Thus, muscle interface device 200 may be adapted to be calibrated to recognize a wide range of user gestures made by a user, based on measurements from a plurality of sensors in the muscle interface device 200.

In an embodiment, muscle interface device 200 may itself be adapted to interpret the gestures from the detected signals as described. However, in an alternative embodiment, the detected signals may be transmitted to the connected device 310 and connected device control 300 to be interpreted as gestures at the connected device control 300. Whether the detected signals are interpreted at the device 200 or at the connected device control 300, the detected signal is first interpreted as a recognized gesture in order to interact with content displayed on the display 310.

In another embodiment, upon interpretation of a gesture, muscle interface device 200 may include a haptic feedback module to provide feedback that a gesture has been recognized. This haptic feedback provides a user with confirmation that the user's gesture has been recognized, and successfully converted to a control signal to interact with content displayed on display 310. The haptic feedback module may comprise, for example, a vibrating mechanism such as a vibratory motor 240 built into the muscle interface device.

Alternatively, rather than haptic feedback provided by the muscle interface device 200, confirmation of recognition of a gesture may be provided by auditory feedback, either generated by a speaker on the muscle interface device, or operatively connected to the connected device 310.

In still another embodiment, confirmation of recognition of a gesture may also be provided visually on the display 310 itself. If there is more than one possible gesture that may be interpreted from the detected signals, rather than providing resulting in an error, the muscle interface device 200 and/or the connected device control 300 may provide a selection of two or more possible gestures as possible interpretation, and the user may be prompted to select from one of them to confirm the intended gesture and corresponding control.

Figure 5:
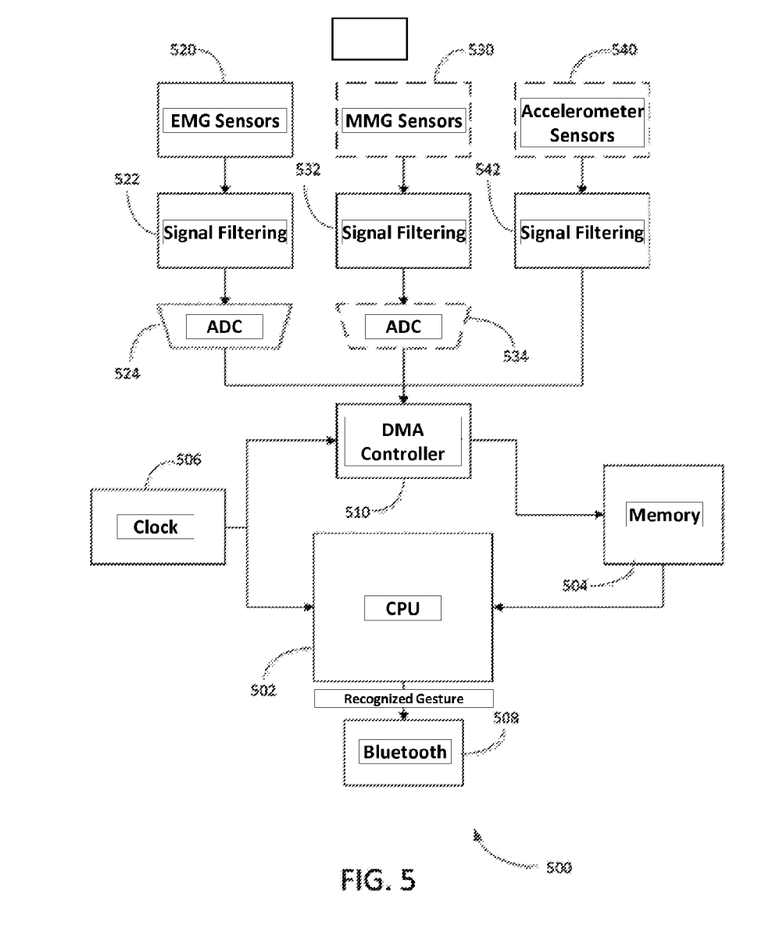
FIG. 5 illustrates a schematic system architecture of a muscle interface device in accordance with an embodiment.

Now referring to FIG. 5, shown is an illustrative schematic system architecture 500 of a muscle interface device in accordance with an embodiment. As shown, system architecture 500 includes a CPU 502, memory 504, system clock 506, a wireless communication module 508 (e.g. Bluetooth™, ZigBee™, etc.), and a direct memory access (DMA) controller 510. As shown, DMA controller 510 is adapted to receive inputs from various sensors including one or more cEMG sensors 520, MMG sensors 530 and accelerometer sensors 540.

In an embodiment, detected analog signals from one or more cEMG sensors 520 are processed through signal filter 532. By way of example, the data is band-passed between 10 Hz to 500 Hz, and amplified by a total of about 1000 to 4000 times. However, this filtering and amplification can be altered by software to whatever is required based on the analog signal generated by the cEMG sensors 520. A notch filter at 60 Hz, or at any other relevant frequency, may also be used to remove powerline noise.

The data is then converted from analog to digital data by ADC 534, for example at 12-bit resolution, and then clocked into onboard memory by the DMA controller to later be processed by the CPU 502. Once data has accumulated, the CPU 502 wakes up and processes this data stored in memory. The number of data points that accumulate before the CPU wakes up is adjustable, and is referred to as the feature window size.

If one or more MMG sensors 530 are also used, then the detected signals from the sEMG sensors 520 are processed through signal filter 522 and converted from analog to digital signals by ADC 524. Digital signals from one or more accelerometer sensors 540 may also be processed through signal filter 542 and received by DMA controller 510.

Gesture Training

In an embodiment, the muscle control device 200 may be trained to recognize a variety of user created gestures. For example, the user may first input a name for a gesture that the user wants the device to be able to recognize, and when the device 200 is ready to record the gesture, the device 100 will prompt the user to make the gesture. The cEMG sensors are then used to acquire data channels sampled on the band (e.g. at 1000 Hz) over a sufficient length of time to cover the duration of the gesture being performed.

In a preferred embodiment, the acquired data is then segmented into windows with a predetermined length, where each window overlaps the previous window by a predetermined length. Features of the cEMG signal are then calculated from each window on each channel of cEMG data. These features are chosen to extract the most relevant information from the raw cEMG data to classify the gesture. For example, if there are eight cEMG channels, and the window size is 100 samples, then the raw window vector is 100×8 in size. If, for example, 15 features are chosen to represent our raw EMG data, then the resultant feature vector calculated from that window would be 1×(8×15), or 1×120.

Figure 6:
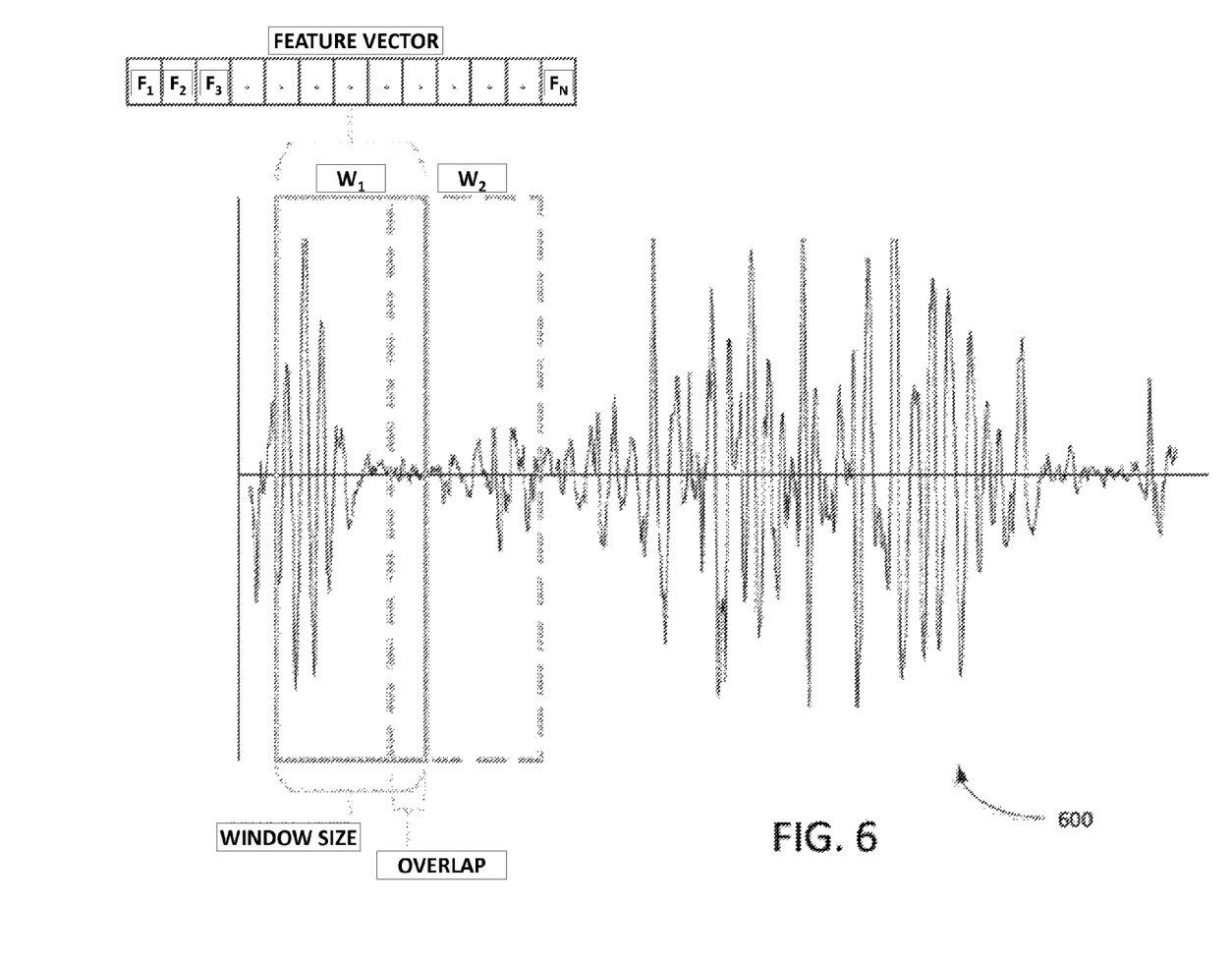
FIG. 6 illustrates a gesture training module utilizing samples having a sliding window with an overlap in accordance with an embodiment.

In an illustrative embodiment, 100 samples are used for the window size, and the gesture training module utilizes a sliding window with an overlap (e.g. 50%). This is illustrated by example in FIG. 6, where W1 represents a window size, W2 represents a second window of the same size, and there is an overlap between the two.

Thus, the vector acquisition frequency becomes sampleFreq/windowSize. The features may include, but are not limited to, wavelet decomposition coefficients, RMS value, slope sign changes, wave length autoregressive coefficients, etc.

In an embodiment, in addition to data acquired from the cEMG sensors, data acquired from the IMU (accelerometer) is segmented into windows corresponding to the cEMG data of the same instants in time. The features extracted are the RMS value, the mean and the standard deviation of the signal.

To train the pattern recognition system, the gesture training module requires at least two sets of data, including example inputs to the system, and the corresponding outputs from the system. The inputs to the gesture training and pattern recognition system are the features that have been calculated from the windows segmented from the raw cEMG data, as well as the IMU (accelerometer) data. The outputs from this system are the detected gestures.

While the user is in the gesture training phase of the system, the user is telling the system what gesture he is performing. This user defined gesture is what will become the output of the system when it enters the real time classification mode. While the system now knows which segments of data correspond to what gesture (since the user defined it), the system does not yet know within that segment of data where the gesture begins and ends (as the user is not always going to start and finish the gesture at the same instant of time every iteration). Therefore, the beginning and end of the gesture must be identified from when the user is not performing the gesture.

Figure 8:
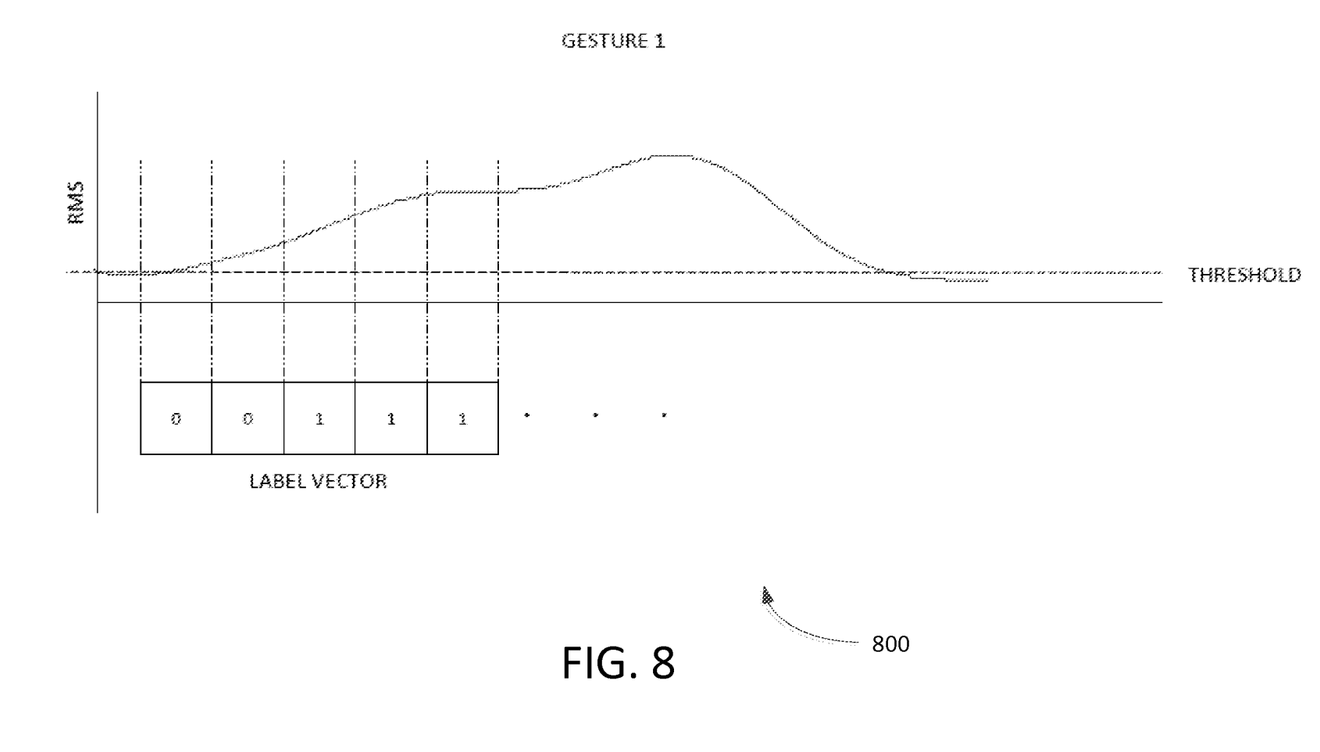
FIG. 8 illustrates monitoring a signal channel for an RMS value that exceeds a certain threshold to initiate gesture recognition.

In an embodiment, the beginning and end of a gesture is determined through EMG data. Assuming that a user has already performed an "on" gesture to turn on the muscle interface device 200, then the system may monitor a signal channel with an RMS value that exceeds a certain threshold, as illustrated by example in FIG. 8. Once that threshold has been exceeded, then the system begins to calculate the features from the data windows and attempts to classify the gestures.

In an embodiment, this is done by analyzing the RMS value of the cEMG data signals. More specifically, when the RMS value of any of the channels of EMG data becomes greater than the average of the channel when no gesture is being performed, plus three times the standard deviation of the data when no gesture is being performed, then the system knows that a gesture is being performed. A separate label vector is being created in sync with the data that is being recorded for the gesture. This label vector contains the data that tells the machine learning algorithms when the feature vectors represent a gesture and what gesture that is, and when the feature vectors represent no input. This information is required for a supervised learning of the pattern recognition algorithm in the next stage described below.

Pattern Recognition Engine

Once the user has finished recording a number of iterations of each gesture, for however many gestures they want to recognize, the system begins the pattern recognition phase. In an embodiment, the system gathers all the recorded feature vectors and their corresponding label vectors into a large matrix representing all of the gestures and all of their iterations.

Figure 7:
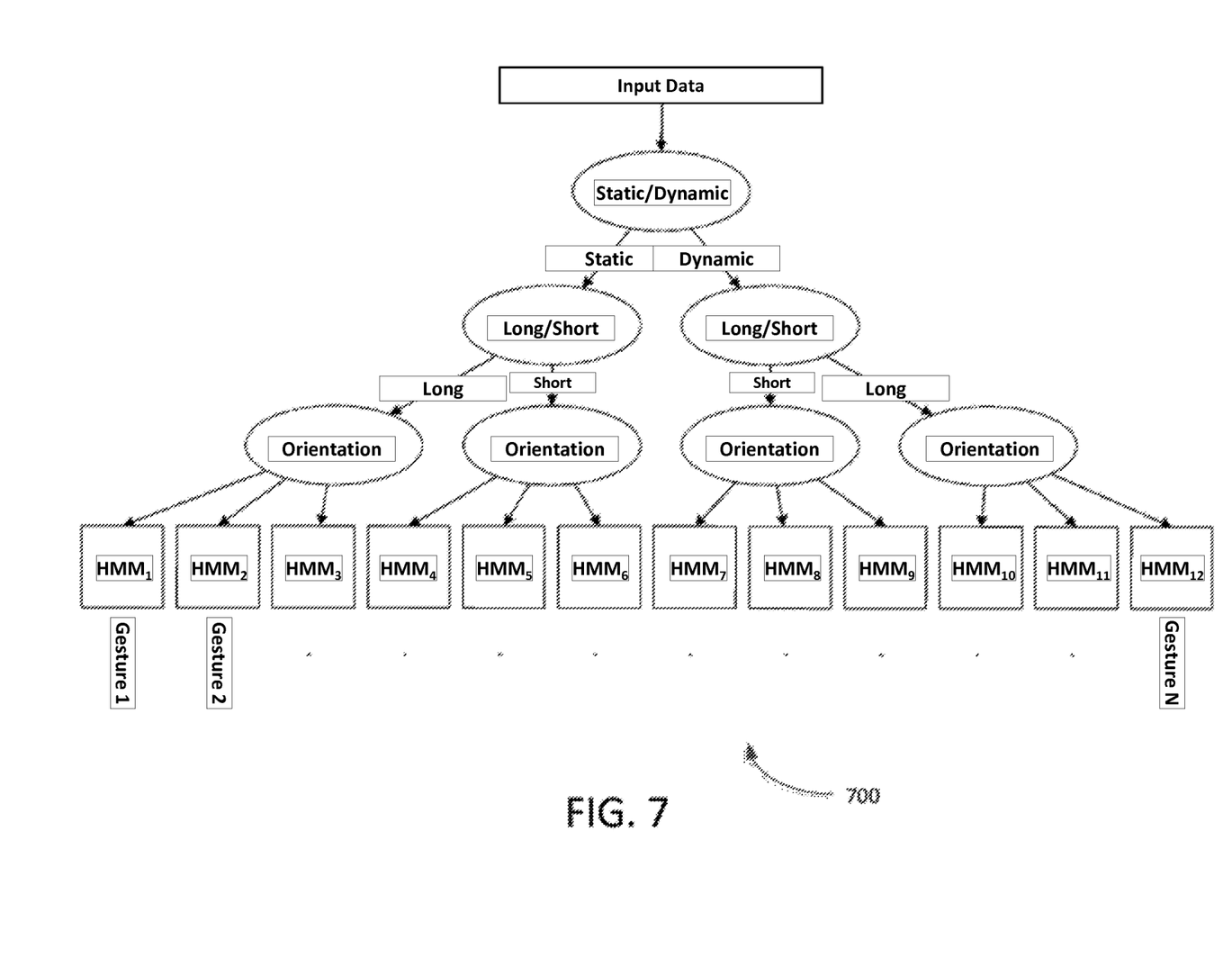
FIG. 7 illustrates a pattern recognition system with a hierarchical decision tree with each node representing a different classifier in accordance with an embodiment.

As shown in FIG. 7, in an illustrative embodiment, the hierarchy of the pattern recognition system consists of a decision tree with each node representing a different classifier. The result from each classifier will determine which branch to traverse down to get to the next node.

In an embodiment, the first node of the decision tree determines if the gesture is static or dynamic. This is determined from the standard deviation of the accelerometer signal.

The second node of the classifier determines whether the gesture is a long or short duration gesture. This is determined by the length of the activated segment of the RMS value of the cEMG signals.

For example, a finger snap or a flick may be a short gesture that is almost instantaneous. A long gesture may be a gesture that takes longer than a short instance to complete.

The third node of the classifier determines the orientation of the hand gesture from the mean value of the IMU, including data from the three axes of the accelerometer.

The last node of the decision tree uses any one of either a Hidden Markov Model, Long-Short Term Neural Net, or other machine intelligence method to classify between the remaining gestures.

The training data is used to train each of the nodes of this tree such that the system will be able to correctly identify unknown gesture data that is fed into the system.

Real Time Classification

Once the muscle control device has been trained, and a pattern recognition engine has been established, the device is configured for real time classification and recognition of a gesture it has been trained to recognize.

In an embodiment, data is collected from the sensors in the muscle control device and stored in the device's on-board memory. The device waits until a predetermined number of samples has been recorded as per the feature window size. When the predetermined number of samples has been reached, the processor in the muscle control device calculates all of the features from that block of data, and passes a vector containing the features to the classifier.

In an embodiment, data is passed through the different nodes of the decision tree as described above, and then on to a final classifier where the gesture is recognized. Once the gesture has been recognized, the gesture and its attributed data are sent to a transceiver module to be sent to the connected device.

If the recognized gesture is determined to be one that utilizes the accelerations of the arm as a positional control input, then the velocity of the arm is also calculated from the accelerations detected by the IMU, and that data is also sent out over the transceiver to the connected device.

Upon successful recognition of a gesture, the vibration motor in the device can be triggered to vibrate for a duration of time to indicate to the user that a gesture has been successfully recognized.

In an embodiment, the vibratory motor can be used in other ways to convey information to the user. This could be subtle vibration during the course of a dynamic gesture, vibration indicating the device has been woken up, vibrating to indicate the device needs to be recalibrated or there is an issue, etc.

Illustrative Methods

Figure 9:
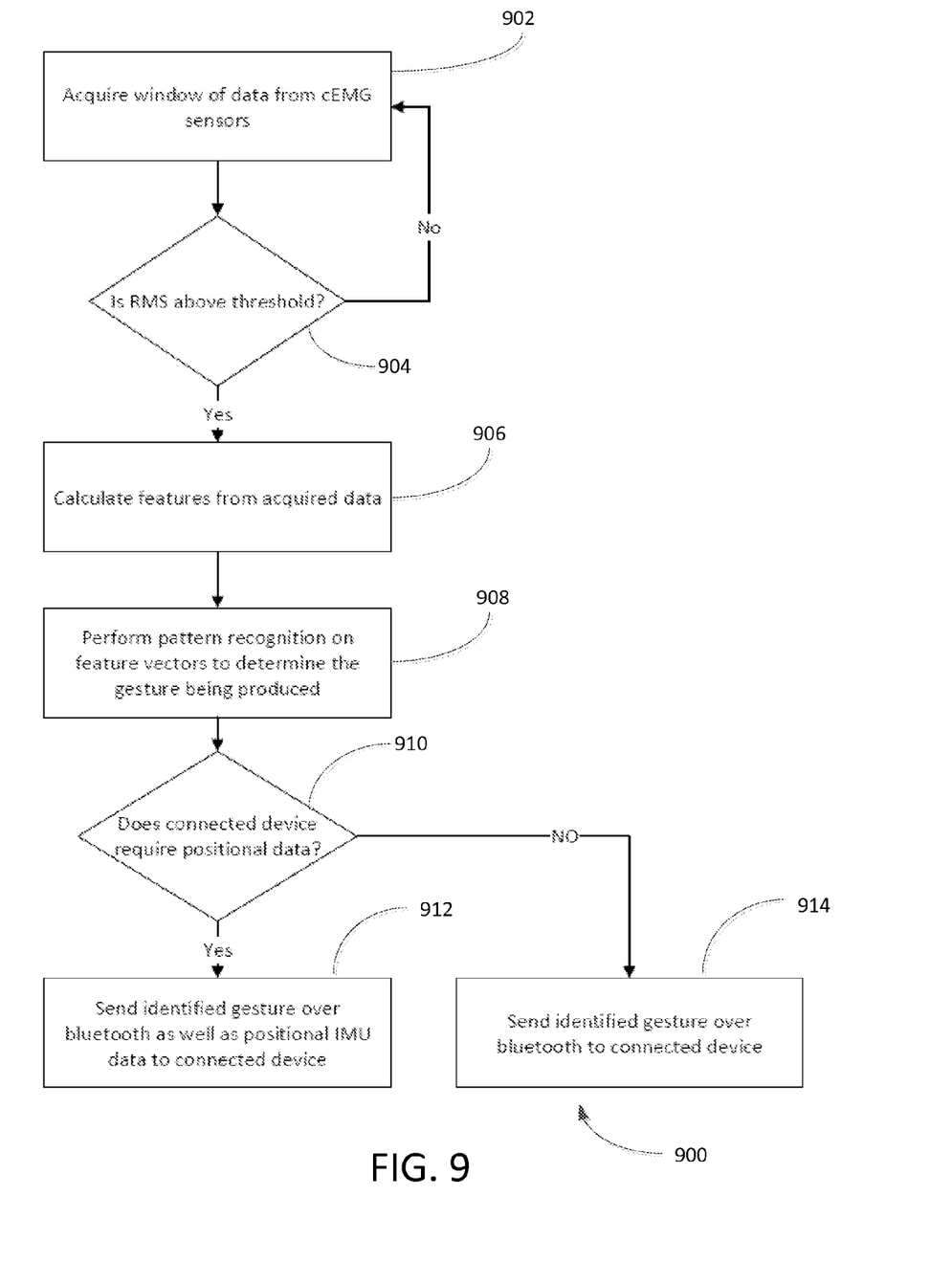
FIG. 9 illustrates a schematic flow chart of a method in accordance with an embodiment.

Now referring to FIG. 9, shown is a schematic flow chart of an illustrative method in accordance with an embodiment.

As shown, method 900 begins at block 902, where method 900 begins by acquiring signals (e.g. a window of data) from a plurality of cEMG sensors and at least one IMU sensor.

Next, at decision block 904, method 900 determines if the RMS of the signals is above a predetermined threshold, to determine if there is a gesture. If no, method 900 returns to block 902. If yes, method 900 then proceeds to block 906, where method 900 calculates the features from acquired data. Method 900 then proceeds to block 908, where method 900 performs pattern recognition on the feature vectors to determine the gesture being produced.

Method 900 then proceeds to decision block 910, where method 900 determines if a connected device requires positional data. If yes, method 900 proceeds to block 912, where method 900 sends an identified gesture together with positional IMU data (e.g. relative velocity and orientation) to the connected device. If no, method 900 proceeds to block 914, where method 900 sends the identified gesture to the connected device. The identified gesture and positional IMU data may be sent over a wired connection to the connected device, or alternatively over a standard wireless communication protocol.

While a wearable head display device has been used as an illustrative example of a connected device, as will be appreciated, the muscle interface device and method of the present disclosure may be used for interaction with many other types of connected devices in virtually any application in which connected devices are contemplated.

Thus, in an aspect, there is provided an apparatus for detecting and analyzing signals for gesture control, comprising: a plurality of capacitive electromyography (cEMG) sensors configured to detect a gesture by measuring in each cEMG sensor an electrical signal produced by an electrical charge induced in an electrode of the cEMG sensors by muscle activity; and a processor configured to receive the one or more electrical signals from the plurality of cEMG sensors as acquired data, process the acquired data by calculating a feature vector representative of a window of acquired data, and detect the gesture by analyzing a resulting feature vector to recognize a pattern.

In an embodiment, the apparatus further comprises one or more inertial measurement unit (IMU) sensors configured to detect motion and orientation of a gesture by measuring relative velocity and orientation of the apparatus; and wherein, the processor is further configured to receive acquired data from the IMU, process the acquired IMU data to determine the position and orientation of the apparatus, and detect the gesture by analyzing the relative velocity and orientation of the apparatus together with the analyzed feature vector.

In another embodiment, the processor is further configured to utilize one or more of a Hidden Markov Model, Long-Short Term Neural Net, or another machine intelligence method to classify the gestures.

In another embodiment, the processor is further configured to detect a static gesture or a dynamic gesture in dependence upon analyzing the acquired IMU data together with the analyzed feature vectors.

In another embodiment, the processor is further configured to determine whether the gesture is a long or short duration gesture by measuring the length of an activated segment of an RMS value of the cEMG signals.

In another embodiment, the processor is further configured to record one or more user defined gestures by recording the resulting feature vectors, and the position and orientation of the apparatus during the gesture.

In another embodiment, the apparatus further includes one or more mechanomyography (MMG) sensors configured to detect muscle activity produced by a gesture by measuring in each MMG sensor an electrical signal produced by the muscle activity.

In another embodiment, the apparatus further includes a haptic feedback module for providing feedback to a user.

In another embodiment, the haptic feedback module provides confirmation of recognition of a gesture.

In another embodiment, the haptic feedback module comprises a vibratory motor.

In another aspect, there is provided a method for detecting and analyzing signals for gesture control, comprising: providing a plurality of capacitive electromyography (cEMG) sensors on an apparatus configured to detect muscle activity produced by a gesture by measuring in each cEMG sensor an electrical signal produced by an electrical charge induced in an electrode of the cEMG sensor; receiving the one or more electrical signals from the plurality of cEMG sensors as acquired data; processing the acquired data by calculating a feature vector representative of a window of acquired data; and detecting the gesture by analyzing a resulting feature vector to recognize a pattern.

In an embodiment, the method further comprises: receiving acquired data from one or more inertial measurement unit (IMU) sensors; processing the acquired IMU data to determine the relative velocity and orientation of the apparatus; and detecting the gesture by analyzing the position and orientation of the apparatus together with the analyzed feature vector.

In another embodiment, the method further comprises utilizing one or more of a Hidden Markov Model, Long-Short Term Neural Net, or another machine intelligence method to classify the gestures.

In another embodiment, the method further comprises detecting a static gesture or a dynamic gesture in dependence upon analyzing the acquired IMU data together with the analyzed feature vectors.

In another embodiment, the method further comprises determining whether the gesture is a long or short duration gesture by measuring the length of an activated segment of an RMS value of the cEMG signals.

In another embodiment, the method further comprises recording one or more user defined gestures by recording the resulting feature vectors, and the position and orientation of the apparatus during the gesture.

In another embodiment, the method further comprises providing one or more mechanomyography (MMG) sensors configured to detect muscle activity produced by a gesture by measuring in each MMG sensor an electrical signal produced by the muscle activity.

In another embodiment, the method further comprises providing a haptic feedback for providing feedback to a user.

In another embodiment, the haptic feedback provides confirmation of recognition of a gesture.

In another embodiment, the haptic feedback comprises a vibratory feedback provided by a vibratory motor.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application Ser. No. 61/768,322, U.S. Provisional Patent Application Ser. No. 61/771,500, U.S. Provisional Patent Application Ser. No. 61/903,238, U.S. Provisional Patent Application Ser. No. 61/909,786, U.S. Provisional Patent Application Ser. No. 61/857,105; U.S. Provisional Patent Application Ser. No. 61/860,063; U.S. Provisional Patent Application Ser. No. 61/822,740; U.S. Provisional Patent Application Ser. No. 61/866,960; U.S. Provisional Patent Application Ser. No. 61/869,526; U.S. Provisional Patent Application Ser. No.

61/874,846; U.S. Provisional Patent Application Ser. No. 61/881,064; U.S. Provisional Patent Application Ser. No. 61/894,263; U.S. Provisional Patent Application Ser. No. 61/915,338; and/or U.S. Provisional Patent Application Ser. No. 61/940,048, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

While various embodiments and illustrative examples have been described above, it will be appreciated that these embodiments and illustrative examples are not limiting, and the scope of the invention is defined by the following claims.

The invention claimed is:

1. An apparatus to detect and analyze signals for gesture control, comprising:
   a band to be worn by a user;
   a plurality of electromyography (EMG) sensors positioned radially around a circumference of the band, each EMG sensor in the plurality of EMG sensors to detect -electrical signals produced by muscle activity in response to the user performing a gesture;
   an inertial sensor carried by the band, the inertial sensor to detect motion in response to the user performing the gesture; and
   a processor carried by the band, the processor communicatively coupled to receive EMG signals from the plurality of EMG sensors and inertial sensor signals from the inertial sensor, and which in use:
   analyzes the EMG signals and recognizes the gesture performed by the user based on the analysis of the EMG signals, and
   analyzes the inertial sensor signals and determines a motion aspect of the gesture based on the analysis of the inertial sensor signals.

2. The apparatus of claim 1 wherein the processor in use further determines the position and orientation of the apparatus based on the analysis of the inertial sensor signals.

3. The apparatus of claim 1 wherein the processor in use analyzes the EMG signals via one or more of a Hidden Markov Model, Long-Short Term Neural Net, or another machine intelligence method to recognize the gesture performed by the user.

4. The apparatus of claim 1 wherein the processor in use further detects a static gesture or a dynamic gesture in dependence upon analyzing the inertial sensor signals.

5. The apparatus of claim 1 wherein the processor in use further determines whether the gesture is a long or short duration gesture by measuring a length of an activated segment of the EMG signals.

6. The apparatus of claim 1 wherein the processor in use further records one or more user defined gestures.

7. The apparatus of claim 1, further comprising:
   at least one mechanomyography (MMG) sensor carried by the band to detect vibrations produced by muscle activity in response to the user performing the gesture.

8. The apparatus of claim 1, further comprising a haptic feedback module to provide haptic feedback to the user.

9. The apparatus of claim 8 wherein haptic feedback provided by the haptic feedback module provides confirmation of recognition of the gesture.

10. The apparatus of claim 8 wherein the haptic feedback module comprises a vibratory motor.

11. The apparatus of claim 1, further comprising a wireless transceiver module carried by the band and communicatively coupled to the processor, the wireless transceiver module to wirelessly transmit at least one signal in response to the processor recognizing the gesture performed by the user.

12. The apparatus of claim 1 wherein the on-board inertial sensor includes at least one sensor selected from the group consisting of: an accelerometer and an inertial measurement unit.

13. The apparatus of claim 1, further comprising an on-board non-transitory computer readable storage memory carried by the band and communicatively coupled to the on-board processor, the on-board non-transitory computer-readable storage memory to store the EMG signals and the inertial sensor signals.

14. A method of operating an apparatus to detect and analyze signals for gesture control, the apparatus including a band worn by a user, a plurality of on-board electromyography (EMG) sensors positioned radially around a circumference of the band, an on-board inertial sensor carried by the band, and an on-board processor carried by the band, the on-board processor communicatively coupled to the plurality of on-board EMG sensors and to the on-board inertial sensor, wherein the method comprises:
   receiving, by the on-board processor, at least one electrical signal from at least one on-board EMG sensor in the plurality of on-board EMG sensors, the at least one electrical signal from at least one on-board EMG sensor indicative of muscle activity in response to the user performing a gesture;
   receiving, by the on-board processor, at least one electrical signal from the on-board inertial sensor, the at least one electrical signal from the on-board inertial sensor indicative of motion in response to the user performing the gesture;
   analyzing, by the on-board processor, the at least one electrical signal received from the at least one on-board EMG sensor
   recognizing the gesture performed by the user by the on-board processor based on analyzing the at least one electrical signal received from the at least one on-board EMG sensor:
   analyzing, by the on-board processor, the at least one electrical signal received from the on-board inertial sensor; and
   determining a motion aspect of the gesture based on analyzing the at least one electrical signal received from the on-board inertial sensor.

15. The method of claim 14, further comprising:
   determining, by the on-board processor, the relative velocity and orientation of the apparatus based on the at least one electrical signal received from the on-board inertial sensor.

16. The method of claim 14 wherein analyzing, by the on-board processor, the at least on electrical signal received from the at least one on-board EMG sensor includes utilizing, by the on-board processor, one or more of a Hidden Markov Model, Long-Short Term Neural Net, or other machine intelligence method to analyze the at least one electrical signal received from the at least one on-board EMG sensor.

17. The method of claim 14, further comprising detecting, by the on-board processor, a static gesture or a dynamic gesture in dependence upon analyzing the at least one electrical signal received from the on-board inertial sensor.

18. The method of claim 14, further comprising measuring, by the on-board processor, a length of an activated segment of an RMS value of the at least one electrical signal received from the at least one on-board EMG sensor in the plurality of on-board EMG sensors.

19. The method of claim 14, further comprising recording, by the on-board processor, one or more user defined gestures.

20. The method of claim 14 wherein the apparatus includes an on-board haptic feedback module carried by the band, the method further comprising providing a haptic feedback to the user by the on-board haptic feedback module.

21. The method of claim 20 wherein the haptic feedback is provided to the user by the on-board haptic feedback module in response to the processor recognizing the gesture performed by the user.

22. The method of claim 14 wherein the apparatus includes an on-board wireless transceiver module, the method further comprising wirelessly transmitting a signal by the on-board wireless transceiver module in response to the on-board processor recognizing the gesture performed by the user.

* * * * *